United States Patent
Han et al.

(10) Patent No.: US 10,169,166 B2
(45) Date of Patent: Jan. 1, 2019

(54) REAL-TIME FAULT-TOLERANT ARCHITECTURE FOR LARGE-SCALE EVENT PROCESSING

(71) Applicant: Beijing Chuangxin Journey Network Technology Co, Ltd, Beijing (CN)

(72) Inventors: Xin Han, Qingdao (CN); Jia Wen, Chengdu (CN); Jianhua Wang, Shanghai (CN); Zhijun Qiao, Beijing (CN); Jin Yu, Union City, CA (US)

(73) Assignee: BEIJING CHUANGXIN JOURNEY NETWORK TECHNOLOGY CO, LTD., Beijing (CN)

( * ) Notice: Subject to any disclaimer, the term of this patent is extended or adjusted under 35 U.S.C. 154(b) by 158 days.

(21) Appl. No.: 14/973,756

(22) Filed: Dec. 18, 2015

(65) Prior Publication Data

US 2017/0177442 A1    Jun. 22, 2017

(51) Int. Cl.
*G06F 11/14* (2006.01)
*G06F 17/40* (2006.01)

(52) U.S. Cl.
CPC ...... *G06F 11/1471* (2013.01); *G06F 11/1415* (2013.01); *G06F 17/40* (2013.01)

(58) Field of Classification Search
CPC ...... G06F 11/14; G06F 11/30; G06F 11/1451; G06F 11/1464; G06F 11/1471; G06F 11/3006; G06F 2201/84

USPC ........................................................ 711/162
See application file for complete search history.

(56) References Cited

U.S. PATENT DOCUMENTS

| 9,497,072 B2* | 11/2016 | Gates | G06F 11/0709 |
| 2011/0246826 A1* | 10/2011 | Hsieh | G06F 11/3476 714/20 |
| 2012/0005542 A1* | 1/2012 | Petersen | G06F 11/0709 714/48 |
| 2015/0039757 A1* | 2/2015 | Petersen | H04L 63/0227 709/224 |
| 2016/0006675 A1* | 1/2016 | Takase | H04L 49/3072 709/223 |

* cited by examiner

*Primary Examiner* — Mohamed M Gebril
(74) *Attorney, Agent, or Firm* — Kilpatrick Townsend & Stockton LLP

(57) ABSTRACT

Techniques described herein include an event notification processing platform configured to process large-scale event notifications in relative real time. The platform may receive event notifications from multiple sources and publish them to an event stream, or log. The platform may subsequently process each notification at a processing module according to one or more sets of rules and the processed information may be made available via a data store. Rule sets may be selected based on the type of event received by the platform. A backup data store may record event notifications as they are received or at periodic intervals. Event notification data may also be stored at multiple levels of the platform, so that in the case of a failure of one or more components of the platform, data may continue to be processed.

18 Claims, 7 Drawing Sheets

REAL-TIME FAULT-TOLERANT ARCHITECTURE FOR LARGE-SCALE EVENT PROCESSING

CROSS-REFERENCES TO RELATED APPLICATIONS

NOT APPLICABLE

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

As more and more consumer data becomes available, there is a drive to find new and useful ways to use that data. In some cases, data related to consumer actions (such as surfing the internet, running an application, or entering a geographic location) may be provided to one or more third parties as event notifications. When a large number of consumers are each producing multiple event notifications, the consumer information stored in a data log may comprise a very large amount of data (e.g., billions of events per day). Sorting through this data to identify information that is useful to a particular user can often take days. As a result, conventional event processing platforms may provide outdated information.

Additionally, each event notification often must be processed before it can produce any useful information. Because such a large number of event notifications must be processed, these operations are often computationally expensive and can strain the platform. This often causes server crashes and resource unavailability that may bring down the entire system. In some cases, this may even result in event notifications becoming lost or irretrievable.

BRIEF SUMMARY OF THE INVENTION

Described herein are techniques for implementing a fault-tolerant event notification processing platform for processing large-scale event notifications. In some embodiments, event notifications are received at an edge node from one or more event sources. An event source may be any user device, application, or module configured to generate an event notification in response to detecting a user interaction. An edge node may be any device capable of receiving and publishing event notifications from one or more event sources. Event notifications published by an edge node may be delivered to a log aggregator for publication into an event stream. A log aggregator may be any computing devices that is configured to receive event notifications from one or more edge nodes and combine them into a single log (or stream). For example, edge nodes publishes or pushes data into log aggregators.

Event notifications published by a log aggregator may be retrieved by one or more processing nodes. A processing node may be any device, application, or module configured to retrieve raw (e.g., unprocessed) event notifications from one or more log aggregators and process them according to one or more workflows or processing guidelines. Event notifications may be processed according to a different set of rules depending on the type of event that is associated with the event notification. The processed result may be stored in a key-value data store. This creates a data store that is easy to query for reporting and business intelligence applications.

The platform may be made fault tolerant by promulgating event notification records to each separate component and storing the event notifications for a period of time at each component. Additionally, event notifications published by one or more log aggregators may be backed up in a separate data store. Accordingly, if one or more components of the platform goes offline, the data may still be retrieved for future processing. It is to be appreciated that the platform described according to embodiments of the present invention function in real-time. The term "real-time" refers to platform's ability to tolerate and/or correct various faults under real time constraint of devices. For example, if there is a fault or error when a user is interacting with the platform, the platform is capable to providing the content that users needed without interrupting the user experience, and that means the platform is able to recover or otherwise solve the fault within seconds of detection and user may not even be aware of the fault.

BRIEF DESCRIPTION OF THE DRAWINGS

Various embodiments in accordance with the present disclosure will be described with reference to the drawings, in which.

DETAILED DESCRIPTION OF THE INVENTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include a system and architecture for providing a fault tolerant event notification processing platform. In particular, the disclosure describes a resilient platform for processing a large volume of events in real-time. Also disclosed is a technique for providing dynamic event ingestion using rules-based computation.

Figure 1:
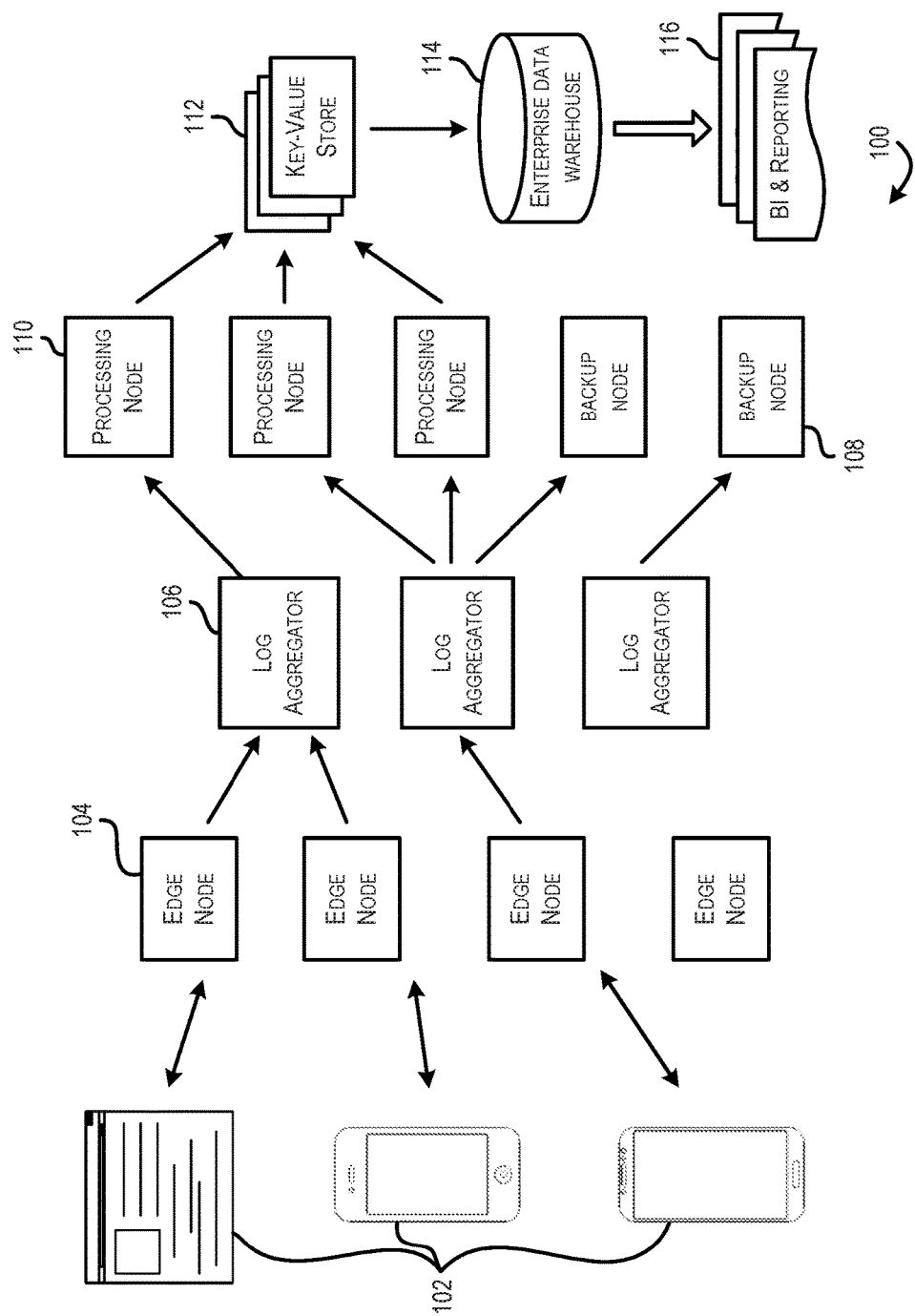
FIG. 1 depicts an illustrative fault-tolerant event processing system in accordance with at least some embodiments.

FIG. 1 depicts an illustrative fault-tolerant event processing system in accordance with at least some embodiments. In FIG. 1, a plurality of event sources 102 are depicted. In accordance with at least some embodiments, an event source 102 may be any device or application capable of providing an event notification related to a user event. For example, an event source may be a web browser, a mobile phone, an application installed on a client device, or any other suitable source of event notifications. Event sources 102 may transmit event notifications when one or more events have occurred. For example, when a user visits a website, an event source 102 may transmit an event notification that indicates that the user has visited the website. In some embodiments, an event source may generate events autonomously, without a user's intervention. For example, when the user enters or exits a particular geographic region, a mobile device in the user's possession may generate an event notification.

Event notifications may be received at an edge node 104. An edge node may be any device capable of receiving event notifications from one or more event sources 102 and publishing them to a log aggregator 106. For example, an edge node may be a Hypertext Transfer Protocol (HTTP) network server configured to process user interactions and generate events. An edge node is typically a computer processing device that includes a central processing unit (CPU), random access memory (RAM), and at least some data storage (either solid state or hard disk) for storing event notification data. In some embodiments, an edge node 104 may receive event notifications from multiple event sources 102. Event notifications may be stored on an edge node 104 for a predetermined period of time. For example, an edge node 104 may be configured to store event notifications for seven days. After that time, the edge node 104 may purge or delete the event notification to free up memory. Some embodiments of the described architecture may include thousands of edge nodes. The number of active edge nodes may be increased or decreased based upon demand. The edge nodes may be distributed throughout a geographic region or they may be grouped into one or more locations. Upon failure of one or more edge nodes, event notifications continue to be received by the remaining edge nodes.

Log aggregators 106 are computing devices that are configured to receive event notifications from one or more edge nodes 104 and combine them into a single log. In some embodiments, the log aggregator may be maintained by a third party (an entity unrelated to the provider of the event notification processing platform). A log may be any means of publishing a series of events. In some embodiments, the log may be a database table in a data store. In some embodiments, the log may be a text file. Event notifications may be stored at the log aggregator 106 for a predetermined period of time. In some embodiments, multiple log aggregators 106 may retrieve event notifications from the same edge node 104. The log aggregators 106 are fault tolerant in that because event notifications are stored on the edge nodes 104 for a period of time, a failure of one or more log aggregators 106 will not result in a loss of availability of the system. Even if all of the log aggregators 106 fail, the failure will not result in the loss of data so long as functionality is restored within the predetermined period of time for which event notifications are stored at the edge nodes 104.

In some embodiments, backup nodes 108 may be configured to retrieve and record event notifications that are published in one or more log aggregator 106 logs to a backup data store. A backup node 108 is typically a computer processing device that includes a central processing unit (CPU), random access memory (RAM), and a large amount data storage. The backup node 108 may store event notification data for a long period of time or indefinitely. The backup nodes 108 are fault tolerant in that because event notifications are stored on the log aggregators 106 for a period of time, a failure of one or more backup nodes 108 will not result in a loss of availability of the system. Furthermore, so long as functionality of the backup nodes 108 are restored within the period of time that the log aggregators 106 store event notifications, no loss of data should occur.

A processing node 110 may be configured to retrieve and process event notifications published in one or more log aggregator 106 logs. A processing node 110 is typically a computer processing device that includes a central processing unit (CPU) with a large amount of random access memory (RAM) and at least some data storage. Because a processing node is performing computations, it may be more prone to failure than other components of the described system. If one or more processing nodes 110 in the described system does fail, then loss of data is unlikely to result. For example, in some embodiments, if a processing node 110 fails, other processing nodes 110 are able to continue processing event notifications from the one or more log aggregators 106. In the event that a large number of processing nodes 110 fail, then two possibilities exist. First, if the processing nodes 110 are restored to functionality within the period of time that the log aggregators 106 store event notifications, then the processing nodes 110 may continue to process event notifications from the log aggregators 106. Alternatively, if the processing nodes 110 are restored to functionality after expiration of the period of time that the log aggregators 106 store event notifications, then the processing nodes 110 may retrieve event notifications from a backup node 108 prior to continuing to process event notifications from the log aggregators 106.

A key-value store 112 is a data store that stores computation results in a format having a primary key and one or more attribute values. The key-value data store is typically a computer processing device that includes a central processing unit (CPU) with a large amount of random access memory (RAM), and a moderate amount of data storage. The key-value data store 112 may comprise temporary storage acting as a "write-buffer" between the processing node 110 and the enterprise data warehouse 114. In some embodiments, the key value data store 112 may comprise a database in the memory of a processing node 110. In some embodiments, key-value data may be replicated across multiple key-value data stores 112. In this way, a failure of one or more key-value data stores 112 will not result in data inaccessibility. In addition, a processing node 110 may store processed event notifications that it is unable to write to a key-value data store 112. In these embodiments, data may be written to the key-value data store 112 as the data store becomes available. In accordance with at least some embodiments, a primary key may be computed using one or more rulesets associated with a type of the event notification. This is described in greater detail below.

The computation results are transferred from the key-value store 112 to an enterprise data warehouse 114 in a pre-determined schedule. This ETL (extract, transform, and load) process is typically performed daily or hourly. The enterprise data warehouse 114 is typically a computer processing device that includes a central processing unit (CPU) with a large amount of random access memory (RAM) and a large amount of data storage (preferably solid state). The enterprise data warehouse 114 may store the information long term. In some embodiments, data stored in the enterprise data warehouse 114 may be aggregated. In some embodiments, event notifications may cause data within the enterprise data warehouse 114 to be incremented, decremented, or otherwise updated. One or more business intelligence (BI) & reporting tool 116 may be given access to the enterprise data warehouse 114 for reporting purposes. For example, the BI & reporting tool 116 may query particular consumer, website, location, or other data from enterprise data warehouse 114. In the case that one or more components of the platform fail (e.g., in the event that new data is not recorded from event notifications), the business intelligence and reporting tool may query the most recent data available.

Figure 2:
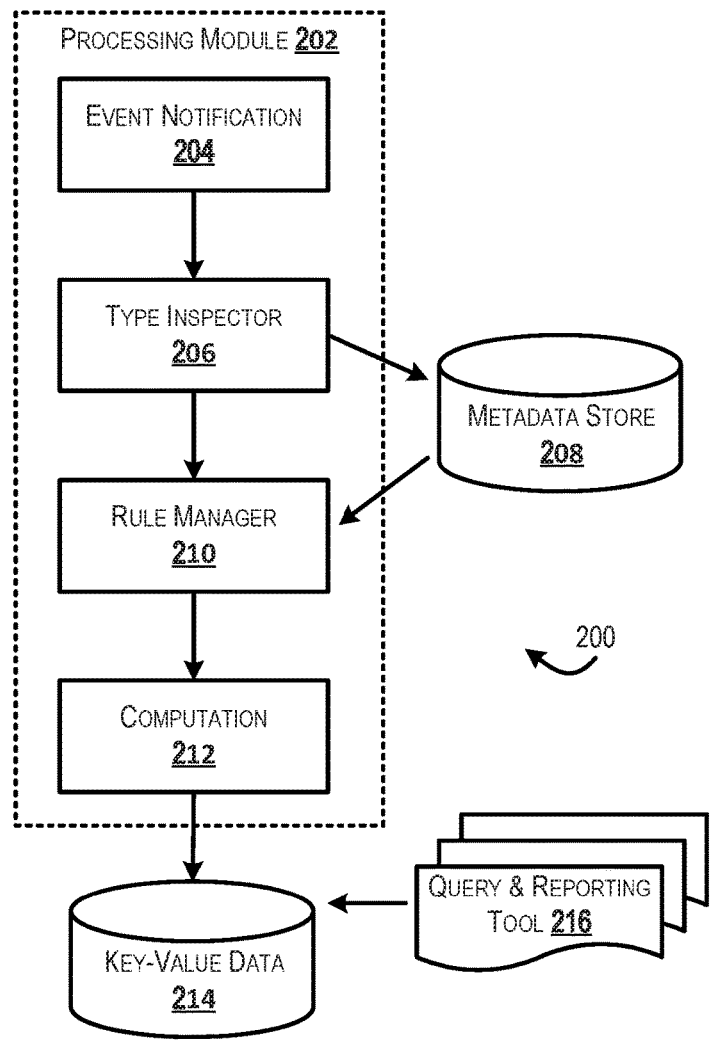
FIG. 2 depicts an illustrative example processing technique that may be performed by an event notification processing module in accordance with at least some embodiments.

FIG. 2 depicts an illustrative example processing technique 200 that may be performed by an event notification processing module in accordance with at least some embodiments. A processing module 202 may comprise computer executable instructions configured to cause a computer system, such as a processing node, to perform the depicted technique. In at least some embodiments, the processing module 202 may retrieve an event notification 204 from a log of a log aggregator. Each event notification 204 may be associated with a particular type of event in the log. For example, the event notification may be related to a user's visiting a website, entering a geographic region, using an application, or any other relevant type of event. The event notification may include an indication of the type of event associated with the notification. For example, the log may include a value in a database field that indicates the event notification is related to a consumer entering a mall.

The type of event related to an event notification may be identified by a type inspector 206. In some embodiments, the type inspector 206 may use the type information to query a metadata store 208. The metadata store 208 may return, in response to the query, metadata associated with the event notification type. In some cases, the query may return no results (indicating that the event notification type is unknown or new), in which case the type may be added to the metadata store 208.

The type inspector 206 may use the type information to query a rule manager 210. The rule manager 210 may return, in response to the query, a rule set associated with the event notification type. A ruleset may be predefined by a user or administrator and may indicate the information for each event type that should be processed. For example, a rule manager 210 may determine that for an event type related to a website having been visited, the following data should be determined: page views, unique visitor count, visitor sum, average time spent on webpage, etc. In this example, the rule manager 210 may provide a rule set outlining how each datum should be calculated.

One or more computations 212 may be performed on the event notification 204 in accordance with the rule set provided by the rule manager 210. The computations 212 may result in values that are stored in a key-value data store 214. In accordance with at least some embodiments, a primary key may be generated for an event notification using one or more rules identified by the rules manager 210. In some embodiments, the rule set may include an indication of database fields in key-value data store 214 to be populated with particular computed data. In some embodiments, the ruleset may include a data format for a new record to be written to a database table in key-value data store 214. Data written to key-value data store 214 may be accessed by one or more query & reporting tools 216. In at least some embodiments, a value may be retrieved from a key-value data store by querying a primary key. In some embodiments, the rule set may include rules for performing roll-up or drill-down computations. In accordance with at least some embodiments, key-value data store 214 (or any other described table) may be an indexed database table. In these embodiments, a primary key may comprise a database index and may be generated using one or more rules selected based on a type associated with the event that resulted in the generation of the event notification.

Figure 3:
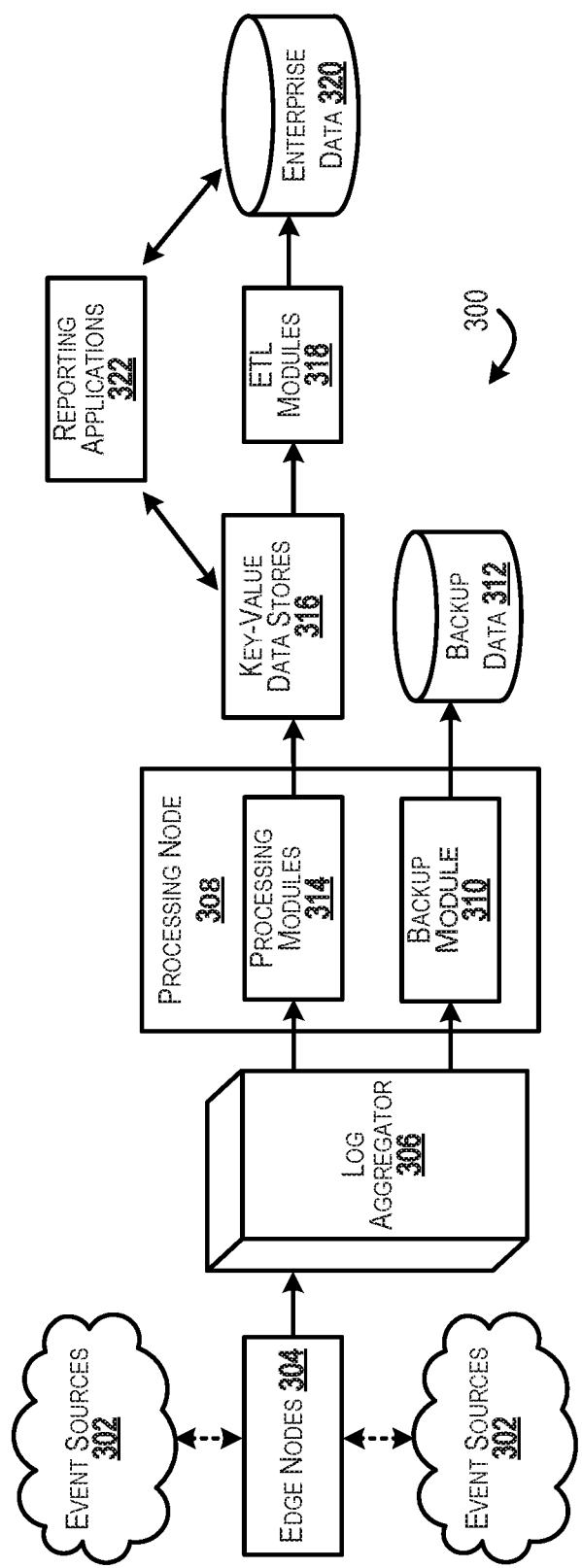
FIG. 3 depicts an illustrative example event processing platform for processing large-scale event notifications in real-time in accordance with at least some embodiments.

FIG. 3 depicts an illustrative example event processing platform for processing large-scale event notifications in real-time in accordance with at least some embodiments. In at least some embodiments, each component of the depicted platform may represent one or more special purpose devices configured to perform the described functions. In some embodiments, each component of the platform may comprise a cluster or group of devices that each perform the same, or a similar, function.

An event source 302 is any application or module configured to report an event triggered by a user, to include a request made by an application or a webpage request. For example, a user electing to visit a website may trigger an event. Likewise, a change in a user's geographical location or status may also trigger an event. As there may be a multitude of potential event triggers, there may be a multitude of event sources 302 for any particular embodiment of the current disclosure. An event may be reported via an event notification. A series of event notifications may referred to as an event stream.

An edge node 304 may be any device, application, or module configured to listen to different event sources 302 and publish event notifications to one or more log aggregator 306. In some embodiments, an edge node 304 may be a server or other computer that is configured to listen to one or more event sources 302. Because notifications of events are received from different types of event sources 302, some embodiments of the disclosure may include edge nodes that are configured to listen to an event stream from a particular event source 302. Each event notification may be associated with an event type that describes the event, a unique identifier, and/or a timestamp indicating the time at which the event occurred. A unique identifier may be created from a number of data related to the event notification. For example, a unique identifier for a particular event notification may be constructed to include an identifier of the edge node at which it was received, a time at which it was received, a sequential indicator, or any other suitable identifying data. A single event type may be associated with multiple edge nodes 304. For example, a particular event type may be received from a number of different event sources 302 and related event notifications may be published from a number of different edge nodes 304.

A log aggregator 306 may be an application or module configured to combine event streams published by one or more edge nodes 304 into a single event stream. In other words, the log aggregator 306 aggregates the event notifications from multiple edge nodes 304 and records them in a single log that may be accessed by multiple stream processing nodes 308. In some embodiments, the log aggregator 306 may comprise a server or other computer configured to listen to edge nodes, extract event notifications, and write the extracted event notifications to one or more logs. In some embodiments, a log aggregator 306 may be configured to receive event notification data pushed to it from one or more edge nodes 304. Event notifications may be associated with a timestamp and a unique identifier. The log aggregator 306 may store an offset identifier (typically an integer), indicating the last event notification processed. In the event of a failure and subsequent restoration of the platform, processing of the event notifications published to the log aggregator may resume at the offset identifier. In some embodiments, the log aggregator may maintain separate logs based on the type of event. For example, event notifications related to a user's change in geographic location may be stored in a log separate from event notifications related to a user's request for a website. In this example, the log aggregator may write all location update event notifications to a single log. In some embodiments, separate stream processing nodes 308 may be used to access one or more separate logs based on the type of event notifications stored in the log. In some embodiments, the log aggregator 306 may be configured to store event notifications for a pre-determined period of time. For example, the log aggregator 306 may store event notifications for seven days. In this example, event notifications may expire, or may be deleted from logs, after seven days.

At least some embodiments of the disclosure may include a backup module 310. A backup module 310 is an application or module configured to read all notifications published by the log aggregator 306 and store records to a backup data store 312. In accordance with at least some embodiments, backup data store 312 may be a distribute file system (DFS). For example, backup data store 312 may be a Hadoop distributed files system (HDFS). In various embodiments, the DFS node or the HDFS node pull data from a log aggregator and store these data without processing. Backup data store 312 may provide long term storage of event notifications. In some embodiments, backup data store 312 may store event notifications indefinitely. In some embodiments, backup data store 312 may store notifications for a period of time longer than the log aggregator 306. This may be used to provide redundancy and fault tolerance. For example, if one or more stream processing nodes 308 fail, then a substantial backlog of unprocessed event notifications may accumulate. In this example, it is possible that one or more event notifications may not be processed prior to expiring or being deleted from the log aggregator's logs. A processing module 314 may compare offset numbers to determine whether one or more event notifications have been missed. For example, a processing module 314 may determine that backup data 312 includes at least one event notification that has an offset number less than those contained in the log aggregator 306 log but greater than the last event notification processed by the processing module 314. In this example, it is likely that at least one event notification expired before it was able to be processed. The processing module 314 may then process the missed event notification before continuing to process event notifications from the log aggregator 306.

A processing module 314 is an application or module configured to retrieve raw (e.g., unprocessed) event notifications from the log aggregator 306 and process them according to one or more workflows or processing guidelines. For example, the processing module 314 may be configured to process application request event types differently than website request event types. In this example, the processing module 314 may maintain workflow or process information associated with application requests that is different from the workflow or process information associated with website requests. In some embodiments, the processing module 314 may process a subset of event notifications from a log aggregator 306. For example, the processing module 314 may process only event notifications related to a particular event type or set of event types. In this example, the processing module 314 may be configured to retrieve all event notifications associated with event types that fall within a particular set of event types from the log aggregator 306 and may process the event notifications according to a common workflow.

A key-value data store 316 is a data store that stores computation results from the processed events in a format having a primary key and one or more attribute values. In accordance with at least some embodiments, a primary key may be computed using one or more rulesets associated with a type of the event notification. In some embodiments, the computation results stored in the key-value data store 316 may be copied to an enterprise data store. In some embodiments, the computation results may be copied in real-time (as it is created in the key-value data store 316) or it may be copied periodically.

The computation results from processed event notifications may be retrieved from the key-value data store 316 by an extract, transform, and load (ETL) module 318 and subsequently stored in an enterprise data store 320. An ETL module is an application or module configured to extract data from one data store, transform that data so that it fits an appropriate format, and load the formatted data into a second data store. In some embodiments, enterprise data store 320 may continuously be updated with computation results as event notifications are processed. In some embodiments, the enterprise data store 320 may be updated periodically by the ETL module 318 to include any new computation results from event notifications that have been processed since the last update. The ETL module 318 may do this on a daily or hourly basis. In at least some embodiments, enterprise data 320 may be made available to one or more reporting applications 322. Reporting applications 322 may query information from enterprise data 320 or from one or more key-value data stores 316.

Figure 4:
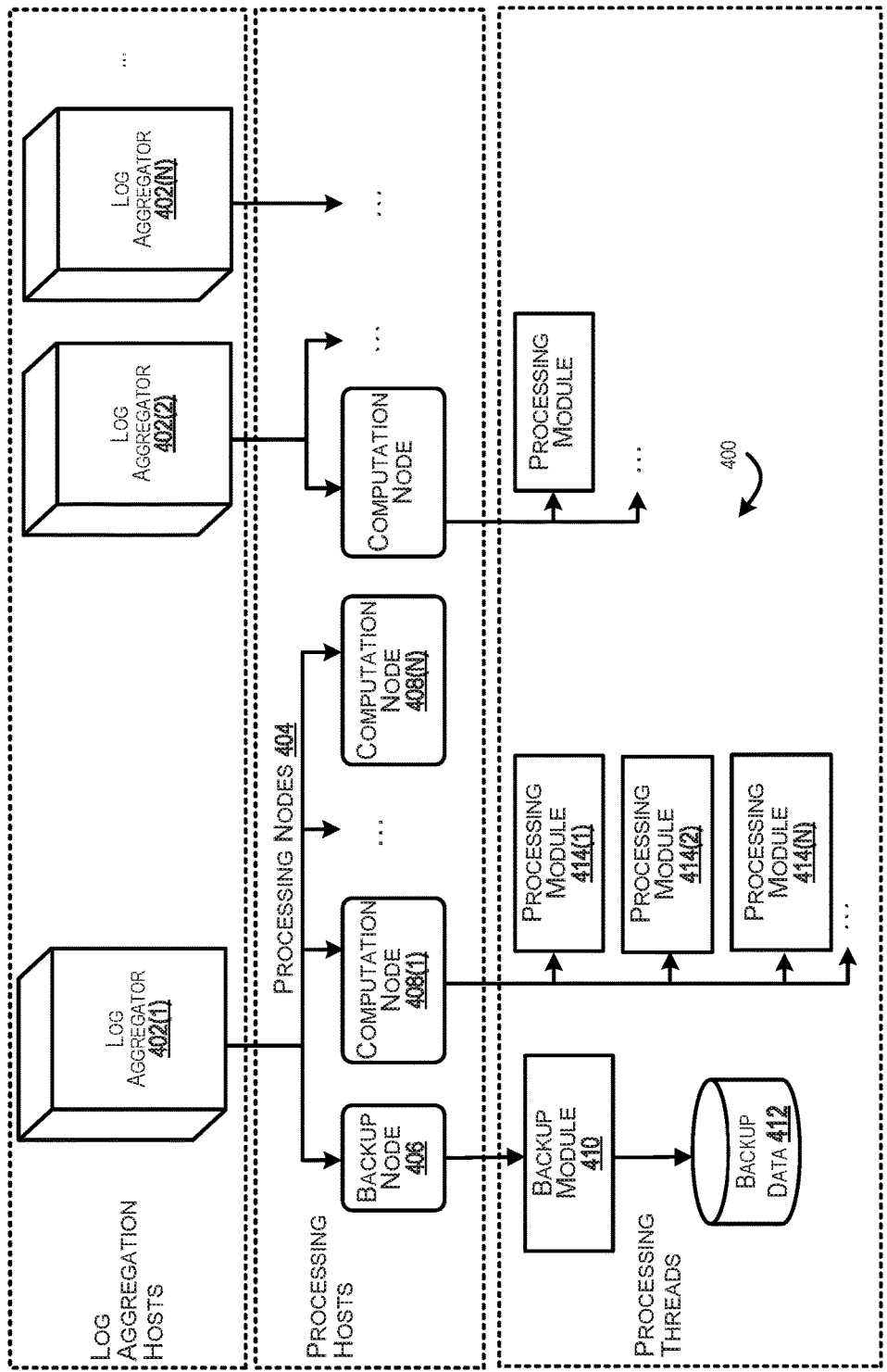
FIG. 4 depicts an illustrative example of a load balancing and scaling technique that may be performed by multiple log aggregators and multiple processing nodes in accordance with at least some embodiments.

FIG. 4 depicts an illustrative example of a load balancing and scaling technique 400 that may be performed by multiple log aggregators and multiple processing nodes in accordance with at least some embodiments. In FIG. 4, multiple log aggregators 402(1-N) are depicted. Each of the depicted multiple log aggregators 402(1-N) may be configured to service separate segments of event notifications according to one or more factors. For example, in some embodiments, log aggregators 402 may be separated according to a region or geographic location. In another example, log aggregators 402 may be separated according to an event type. In yet another example, log aggregators 402 may be separated in order to service one or more edge nodes. In at least some embodiments, multiple log aggregators 402 may be assigned to each separate segment.

In a load balancing and scaling operation 400, each processing node 404 may read from multiple log aggregators 402. In addition, each log aggregator 402 may provide service to multiple processing nodes 404. In accordance with at least some embodiments, processing nodes 404 may comprise different types of servers. For example, processing nodes 404 may comprise one or more backup node 406 and one or more computation node 408. Additionally, the number of processing nodes or hosts may be dynamically adjusted in order to scale resource use. Sets of processing nodes 404 may also be regionally hosted. For example, processing nodes 404 servicing log aggregator 402(1) may be local to a different region than processing nodes servicing log aggregator 402(2). Although FIG. 4 depicts the processing nodes 404 as being multiple types of servers (i.e., backup node 406 and computation node 408), some embodiments of the disclosure may be implemented to include one or more generic servers configured to perform multiple functions. For example, a server may implement instances of the log aggregator, the backup module 410, and the processing modules 414.

At least some embodiments of the disclosure may include a backup node 406. A backup node 406 may implement one or more instances of a backup module 410 configured to record log data from the log aggregator 402 to a backup data store 412. In some embodiments, a backup module 410 may periodically take a "snapshot" (a current image) of the log data to store in backup data 412. This may allow an administrator or other user to review the log data that was being processed at a particular time. In some embodiments, the backup module 410 may be configured to detect event notifications as they are published by the log aggregator 402 to a log and record them at backup data store 412.

In at least some embodiments, the computation node 408(1) may process data from the log aggregator 402 using one or more of the applications or modules described in FIG. $$$. In some embodiments, each application or module may be implemented in a separate processing thread on the computation node 408. For example, computation node 408 may launch several instances of a processing module 414, each of which may be launched in a separate processing thread. In other words, each of processing modules 414(1-N) may retrieve event notifications from log aggregator 402(1) as the event notification is published. In some embodiments, each instance of processing module 414(1-N) may update event notifications to indicate a status. For example, as an instance of the processing module 414 selects an unprocessed event notification to be processed from a log maintained by the log aggregator 402, the log may be updated to indicate that the instance of the processing module 414 has begun work on the event notification in order to prevent other instances of the processing module 414 from working on the same event notification. By way of a second example, each instance of the processing module 414 may update log maintained by the log aggregator 402 to indicate that an event notification has finished being processed. In some embodiments, the system may include a cleanup application that detects unprocessed event notifications and updates the log to trigger processing of the unprocessed event notifications.

In accordance with at least some embodiments, event notification processing may be scaled up or down depending on the number of unprocessed event notifications on one or more log aggregators 402. In some embodiments, additional processing nodes 404 may be brought online to service a particular log aggregator upon determining that the number of unprocessed event notifications for that log aggregator is above a threshold value. In some embodiments, additional processing threads may be spun up on one or more computation nodes upon determining that the number of unprocessed event notifications is above a threshold value. In some embodiments, one or more computation nodes may be shut down or placed into a lower operating state in response to determining that the number of unprocessed event notifications is below a threshold value. In some embodiments, one or more processing nodes 404 may be switched from servicing a first log aggregator to a second log aggregator upon determining that the second log aggregator has a higher number of unprocessed event notifications than the first log aggregator.

Figure 5:
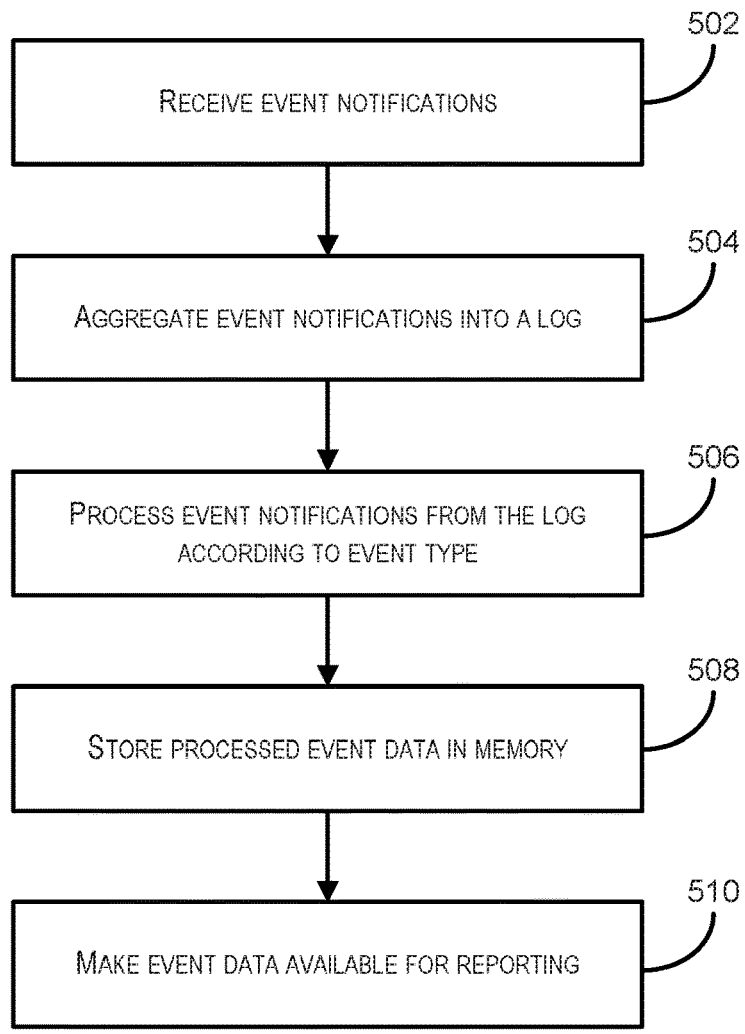
FIG. 5 depicts an illustrative flow diagram demonstrating an example technique for providing large-scale event notification processing in accordance with at least some embodiments.

FIG. 5 depicts an illustrative flow diagram demonstrating an example technique for providing fault-tolerant large-scale event notification processing in accordance with at least some embodiments. The process 500 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 500 (or any other processes described herein, or variations and/or combinations thereof) may be performed under the control of one or more computer systems configured with executable instructions and may be implemented as code (e.g., executable instructions, one or more computer programs or one or more applications). The code may be stored on a computer-readable storage medium, for example, in the form of a computer program including a plurality of instructions executable by one or more processors. The computer-readable storage medium may be non-transitory.

Process 500 may begin at 502 when one or more event notifications are received at a service provider from one or more event sources. For example, the service provider may receive a number of event notifications from multiple user devices. The event notifications may be aggregated into a single log (or event stream) at 504. The service provider may then process each notification according to one or more sets of rules and according to event type at 506. The processed event notifications may provide data related to one or more users of the multiple user devices. The data from the processed events may be stored at a data memory store 508. In some embodiments, the service provider may store old and/or outdated data for one or more users that is updated or replaced by data processed from the event notifications. For example, the event notifications may contain location data for the user that is processed by the service provider. In this example, the service provider may track the user's current location. As each event notification is received from the user's user device, the service provider may identify location information and update the data store with the user's current location. In some embodiments, the service provider may also store the user's historical location data, or the data related to other locations that the user has visited. Either current data or historical data may be made available for reporting at 510. At each step of process 500, a service provider may maintain a link to a user's most recent data. The service provider may update the link as new data related to the user is received.

Figure 6:
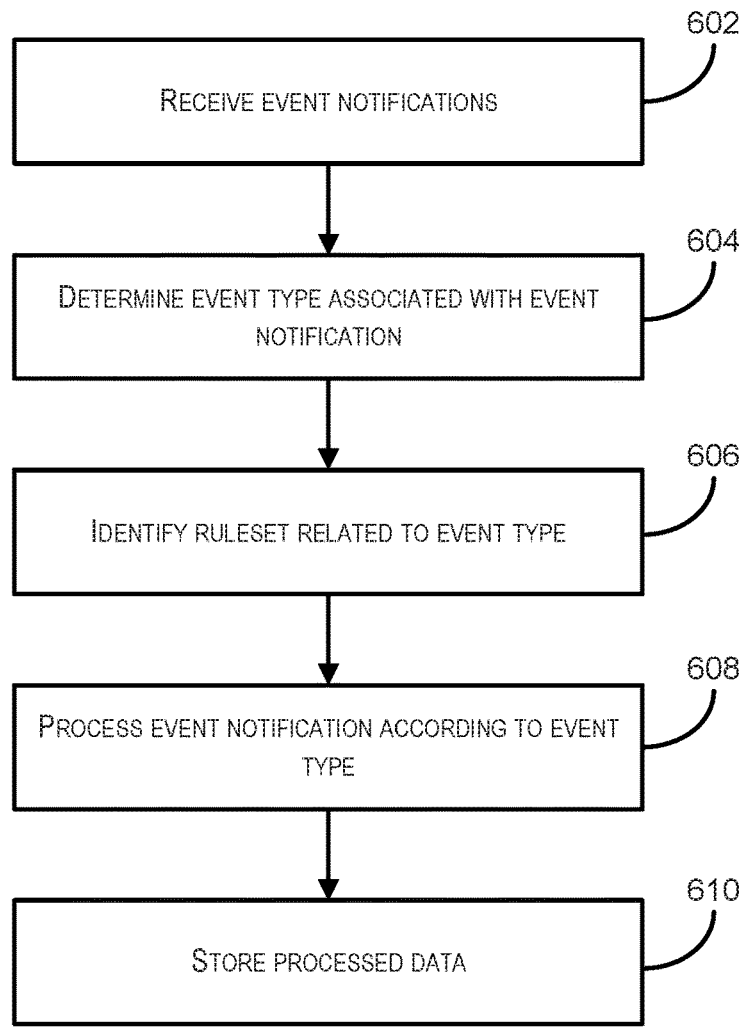
FIG. 6 depicts an illustrative flow diagram demonstrating an example technique for processing event notifications according to event type in accordance with at least some embodiments.

FIG. 6 depicts an illustrative flow diagram demonstrating an example technique for processing event notifications according to event type in accordance with at least some embodiments. The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Process 600 may begin at 602 when one or more event notifications are received at a service provider from one or more event sources. The service provider may be configured to identify an event type associated with the event notification at 604. In some embodiments, an event type may be determined from the source of the event, a format of the event notification, metadata associated with the event notification, or any other suitable indication of the event type. Once the service provider identifies the event type associated with the event notification, the service provider may query a metadata store for metadata related to the event type. Metadata related to an event type may include rules for generating primary keys based on the event type, formatting rules for processed event notification data, extraction rules for processed event notification data (e.g., attribute values to be extracted from an event notification for each event type), or any other suitable metadata.

Upon identifying the type of event associated with the event notification, the service provider may identify a rule set associated with the event type at 606. Rule sets may be stored at a rule data store. A rule set may include a process workflow or other set of directives. The service provider may process the each event notification according to the ruleset associated with that event type at 608. Once the data from the event notification is processed according to the identified rule set, the processed data may be stored in a data store at 610. Processed data may be stored in association with the user that the event notification is related to. For example, the service provider may maintain an account, along with attribute values, for each user associated with generated event notifications.

Figure 7:
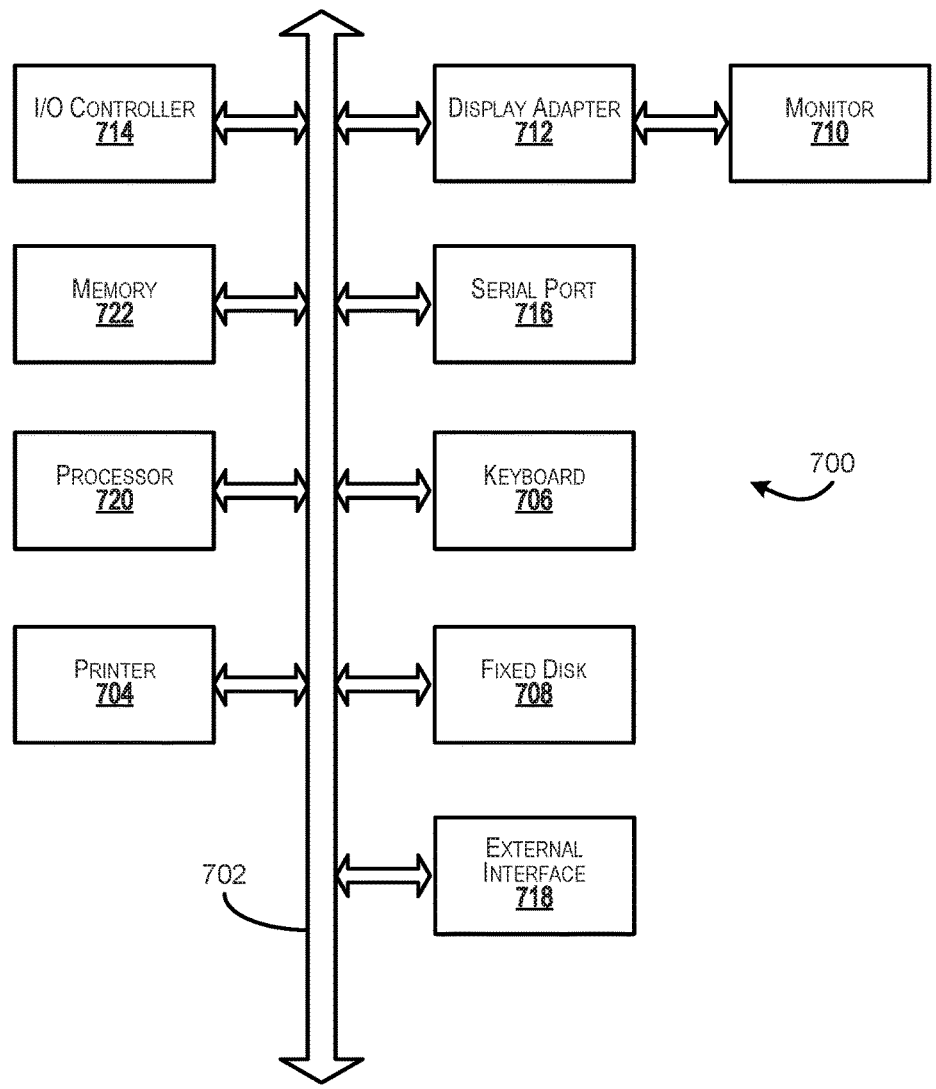
FIG. 7 depicts aspects of elements that may be present in a computer device and/or system configured to implement a method and/or process in accordance with some embodiments of the present invention.

In accordance with at least some embodiments, the system, apparatus, methods, processes and/or operations for event processing may be wholly or partially implemented in the form of a set of instructions executed by one or more programmed computer processors such as a central processing unit (CPU) or microprocessor. Such processors may be incorporated in an apparatus, server, client or other computing device operated by, or in communication with, other components of the system. As an example, FIG. 7 depicts aspects of elements that may be present in a computer device and/or system 700 configured to implement a method and/or process in accordance with some embodiments of the present invention. The subsystems shown in FIG. 7 are interconnected via a system bus 702. Additional subsystems such as a printer 704, a keyboard 706, a fixed disk 708, a monitor 710, which is coupled to a display adapter 712. Peripherals and input/output (I/O) devices, which couple to an I/O controller 714, can be connected to the computer system by any number of means known in the art, such as a serial port 716. For example, the serial port 716 or an external interface 718 can be utilized to connect the computer device 700 to further devices and/or systems not shown in FIG. 6 including a wide area network such as the Internet, a mouse input device, and/or a scanner. The interconnection via the system bus 702 allows one or more processors 720 to communicate with each subsystem and to control the execution of instructions that may be stored in a system memory 722 and/or the fixed disk 708, as well as the exchange of information between subsystems. The system memory 722 and/or the fixed disk 708 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A system, comprising:
    one or more processor devices; and
    a plurality of event nodes, each for receiving a respective portion of a plurality of event notifications; and
    a plurality of log aggregation nodes configured to receive the plurality of event notifications from the plurality of even nodes, a first log aggregation node of the plurality of log aggregation nodes being configured to publish the plurality of event notifications to a log, the log storing the event notifications for a first period of time;
    a backup node configured to record the plurality of event notifications from the log in a separate data store and to store the event notifications for a second period of time that is longer than the first period of time; and
    a processing node configured to retrieve the plurality of event notifications from the log and to process the plurality of event notifications according to a ruleset,
    wherein, upon a failure of the processing node during processing of the plurality of event notifications and subsequent restoration of functionality of the processing node:
    the processing node is configured to resume processing of the event notifications by retrieving remaining ones of the plurality of event notifications from the log when the subsequent restoration of functionality of the processing node is prior to expiration of the first period of time; and
    the processing node is configured to resume processing of the event notifications by retrieving remaining ones of the plurality of event notifications from the backup node when the subsequent restoration of functionality of the processing node is after expiration of the first period of time.

2. The system of claim 1, wherein a failure of the first log aggregation node, the processing node, or the backup node does not result in a loss of data.

3. The system of claim 1, wherein the processing node is further configured to:
    identify an event type associated with the event notification;
    retrieve the ruleset associated with the event type; and
    process the one or more event notifications according to the ruleset associated with the event type.

4. The system of claim 3, wherein a primary key is generated using the retrieved ruleset.

5. The system of claim 1, wherein the one or more event notifications are each associated with a timestamp.

6. The system of claim 1, wherein the processing node is further configured to process an unprocessed event notification from the separate data store prior to processing the one or more event notifications from the log.

7. A computer-implemented method, comprising:
    receiving an event notification via a communication interface and storing the received event notification at a data storage;
    writing the event notification to an event stream by two or more log aggregator nodes, the event notification being stored by a log aggregator node for a first period of time;
    copying the event stream to a separate data store that stores the event stream for a second period of time that is longer than the first period of time, the first period of time and the second period of time being partially overlapping;
    monitoring differences between the separate data store and the event stream;
    processing the event notification according to one or more computation rules, such that, upon a failure during the processing and a subsequent restoration:
    the processing comprises resuming processing of the event notification by retrieving the event notification from the log aggregator node when the subsequent restoration is prior to expiration of the first period of time; and
    the processing comprises resuming processing of the event notification by retrieving the event notification from the separate data store when the subsequent restoration of functionality of the processing node is after expiration of the first period of time; and
    storing the processed event notification.

8. The computer-implemented method of claim 7, wherein copying the event stream is done with respect to a point in time.

9. The computer-implemented method of claim 7, wherein the processed event notification is stored in an indexed table.

10. The computer-implemented method of claim 9, wherein an index for the index table is generated based at least in part on a type of event associated with the event notification.

11. The computer-implemented method of claim 10, wherein the one or more computation rules include a rule for generating the index.

12. The computer-implemented method of claim 7, wherein the event notification is received from a user device.

13. The computer-implemented method of claim 7, wherein the event notification includes information related to an action performed by a user.

14. A non-transitory computer-readable storage medium storing computer-executable instructions that, when executed by a processor, cause a computer system to at least perform operations comprising:
    receiving event notifications from multiple user devices via a communication interface;
    publishing the received event notifications to a data log for processing by two or more log aggregator nodes, the event notifications being published for a first period of time;
    recording the published event notifications to a backup data store using a data storage during a second period of time, the first period of time being shorter than the second period of time; and
    instantiating at least one processing module configured to process the published event notifications according to one or more workflows, such that, upon a failure of the at least one processing module during processing of the published event notifications and a subsequent restoration of functionality of the at least one processing module;
    the at least one processing module is configured to resume processing of the published event notifications by retrieving remaining ones of published event notifications from the data log when the subsequent restoration of functionality of the at least one processing module is prior to expiration of the first period of time; and
    the at least one processing module is configured to resume processing of the published event notifications by retrieving remaining ones of published event notifications from the backup data store when the subsequent restoration of functionality of the at least one processing module is after expiration of the first period of time.

15. The computer-readable storage medium of claim 14, wherein the event notifications are published to the backup data store as they are received.

16. The computer-readable storage medium of claim 14, wherein the processing module is further configured to identify a workflow for each event notification based at least in part on a type of event associated with the event notification.

17. The computer-readable storage medium of claim 14, wherein the instructions further cause the computer system to store processed data in a format determined based at least in part on a type of event associated with the event notification.

18. The system of claim 1, wherein each of the plurality of event nodes stores the respective portion of the plurality of event notifications for a third period of time that overlaps, and is longer than, the first period of time.

* * * * *